United States Patent [19]

Kravitz

[11] Patent Number: 5,219,105
[45] Date of Patent: Jun. 15, 1993

[54] VEHICLE MOUNTABLE CARRIER

[76] Inventor: Harley A. Kravitz, 3041 Brainard Rd., Pepper Pike, Ohio 44124

[21] Appl. No.: 525,969

[22] Filed: May 18, 1990

[51] Int. Cl.⁵ .............................................. B60R 9/10
[52] U.S. Cl. ............................................ 224/42.03 B
[58] Field of Search ............... 224/42.03 B, 42.03 R, 224/42.03 A, 42.42, 42.45 R

[56] References Cited

U.S. PATENT DOCUMENTS

| | | | |
|---|---|---|---|
| 2,431,400 | 11/1947 | Iverson | 224/42.03 B |
| 3,841,544 | 10/1974 | Berger | 224/42.03 B |
| 4,050,616 | 9/1977 | Mosow | 224/42.03 B |
| 4,318,501 | 3/1982 | Graber | 224/42.03 B X |
| 4,337,882 | 7/1982 | Hampton | 224/42.03 R |
| 4,411,461 | 10/1983 | Rosenberg | 224/42.03 B X |
| 4,438,875 | 3/1984 | Fritsch | 224/42.03 B |
| 4,461,410 | 7/1984 | Tartaglia | 224/42.03 B |
| 4,635,835 | 1/1987 | Cole | 224/42.03 B X |
| 4,640,658 | 2/1987 | Webb, Jr. | 224/42.03 R X |
| 4,676,413 | 6/1987 | Began et al. | 224/42.03 B |
| 4,676,414 | 6/1987 | Deguevara | 224/42.03 B X |
| 4,705,448 | 11/1987 | Mungons | 224/42.03 B X |
| 4,744,590 | 5/1988 | Chesney | 224/42.08 X |
| 4,815,638 | 3/1989 | Hutyra | 224/42.03 B |
| 4,856,686 | 8/1989 | Workentine | 224/42.03 B X |

FOREIGN PATENT DOCUMENTS 1372017  8/1964  France .......................... 224/42.03 B

OTHER PUBLICATIONS

Ideal Ideals International literature, 1 page, 1986.
ACAR car carrier literature, p. 107, no effective date given.
Troxel carrier literature, 1 page, no effective date given.

Primary Examiner—Henry J. Recla
Assistant Examiner—Robert M. Fetsuga
Attorney, Agent, or Firm—Watts Hoffmann Fisher & Heinke

[57] ABSTRACT

A modular vehicle mounted bicycle carrier. The carrier includes a selected one of a set of mounting brackets for mounting on either a tongue or tubular trailer hitch or a bumper. Each mounting bracket has a base post adapted to receive a support post which in turn telescopically receives a carrier post. A bicycle carrier is atop the carrier post. The posts are vertically adjustable relatively to provide a carrier height appropriate for the application.

7 Claims, 3 Drawing Sheets

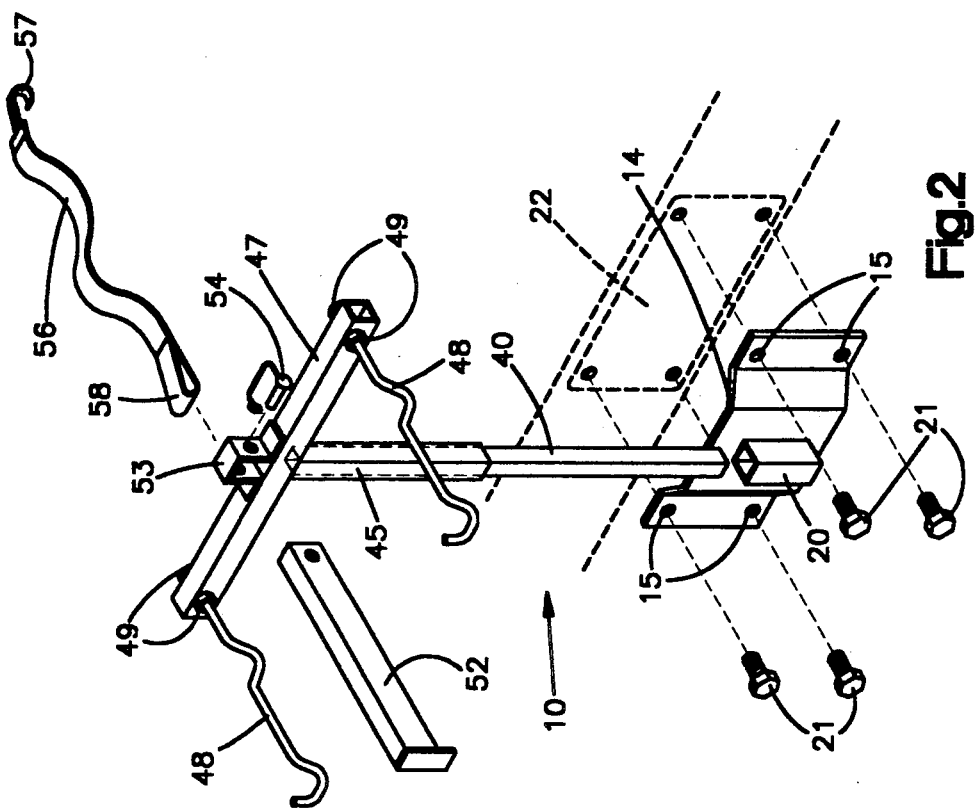
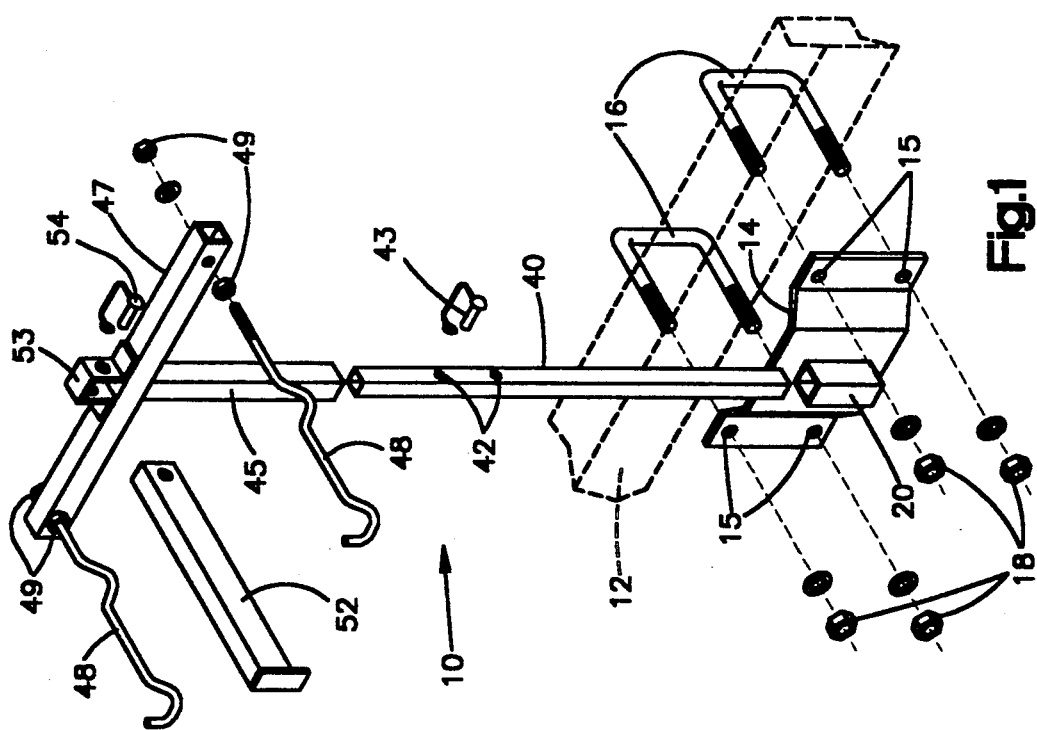

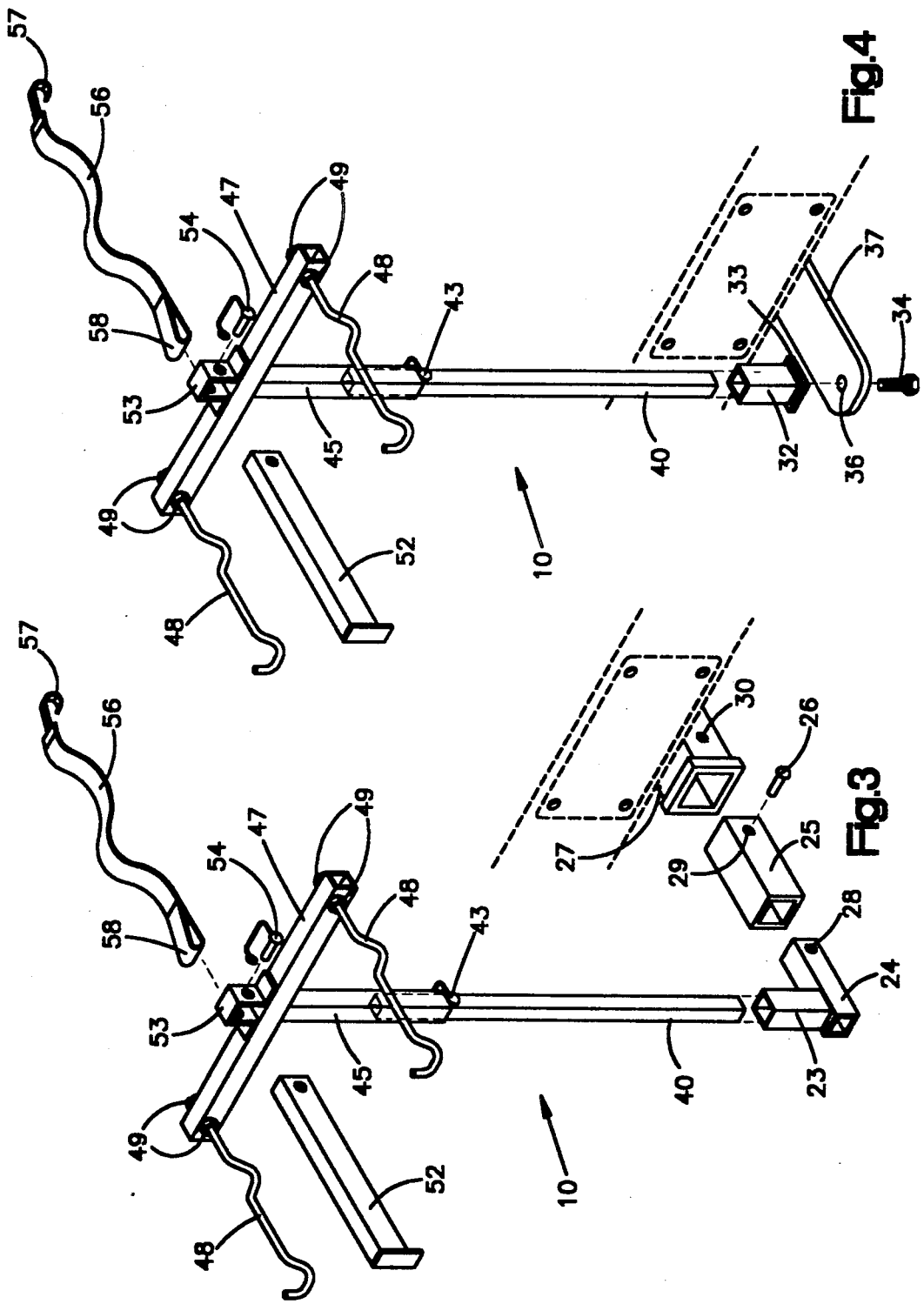

VEHICLE MOUNTABLE CARRIER

FIELD OF THE INVENTION

This invention relates to vehicle mountable article carriers and more particularly to modular article carriers adapted to be mounted on a location appropriate for a selected one of a variety of vehicles on which it is to be mounted. The carriers are especially suited for transport of bicycles.

BACKGROUND OF THE INVENTION

Carriers for supporting bicycles on a vehicle for transportation of the bicycles are well known. There have been proposals for carriers that are mounted on the rear bumper of automobiles, others for mounting on the front bumper of automobiles and still others for mounting on the rear bumper of recreational vehicles. There have also been proposals for carriers that mount on trailer hitches.

Such prior proposals have been designed for specific application and specific mounting because the mounting requirements for each are different. For example, some of these proposals are adapted for mounting on so-called tongue hitches while others are adapted for mounting on receiver hitches.

A so-called tongue hitch will typically be a relatively flat apertured plate. A ball for towing a trailer will be secured to the tongue by inserting a stud connected to the ball through the aperture of the plate and securing it in place with a nut. A receiver hitch by contrast has a rearwardly projecting rectangular tube that is usually square. A tube carrying a ball is selectively placed in telescopic relationship with the rearwardly projecting tube and held in place by a suitable pin.

In addition to the variables in mounting, the elevation of the transported bicycles above the carrier mounting is a variable. For example if a bicycle is mounted on the front bumper of a vehicle a relatively low elevation with respect to the bumper is required so that the driver of the vehicle will not have a bicycle obstructed view. If the carrier is mounted on a trailer hitch or a rear bumper of an automobile the elevation above the mounting should be somewhat higher than a front bumper mounted bicycle so that the bicycles will clear the ground when transported over uneven terrain, up ramps and the like.

When bicycles are mounted on a recreational vehicle the elevation of the bicycles above the mounting typically should be even higher than when mounted on the rear bumper or trailer hitch of an automobile. The reason is that recreational vehicles tend to have substantial rearward overhangs and rear clearance can become a problem when the recreational vehicle negotiates such things as a ramp into a service station.

While there have been proposals, as we have indicated, for mounting bicycle and other equipment carriers to front and rear bumpers of both automobiles and recreational vehicles and others for connection to either a tongue or a receiver type trailer hitch, each of these proposals has been especially configured for a specific type of installation.

SUMMARY OF THE INVENTION

An article carrier made in accordance with the present invention is a modular carrier suitable for mounting on any of a number of mounting brackets. With but three mounting brackets the modular hitch is suitable for mounting on front bumpers of automobiles and pick-up trucks, or rear bumpers of recreational vehicles and on either tongue or receiver type hitches. Moreover the elevation of the a bicycle carrier above the mounting is readily selectable using the same modular components to accommodate any of a variety of height requirements appropriate for each of a variety of applications.

Each of the mounting brackets includes an upstanding socket or post adapted to telescopically receive a support post. A carrier post telescopically engages the top of the support post. A carrier arm and brackets are mounted atop the carrier post. Apertures are provided in at least the support post for receipt of a height control pin which limits the extend of telescoping engagement of the support and carrier posts. Where a lower height is required, such as for mounting on the front of a vehicle, the pin is removed and the carrier post telescopes to its full extent onto the support post.

For mounting of the modular carrier on a square bumper, squared U-bolts and a brackets are secured to the bumper. A support post receiving socket is on the bracket. When one wishes to use the carrier one simply telescopes the support post into the socket.

For front bumper mounting the same bracket is used as in the square bumper mounting. The bracket is simply bolted to a license plate mounting location on the bumper.

Where a receiver type trailer hitch is used an upstanding mounting post is carried by a bracket tube which telescopes into a tube of the receiver hitch and a pin retains the bracket tube in place. For tongue type hitches, the trailer ball is removed and a mounting post is bolted onto the tongue in its stead. Such mounting posts each receive a support post in telescopic relationship when it is desired to mount a carrier on a hitch.

Accordingly an object of the invention is to provide a novel and improved modular carrier for mounting on a vehicle and more specifically to provide a novel and improved bicycle carrier which is suitable for mounting in a selected one of a variety of mounting locations.

BRIEF DESCRIPTION OF THE DRAWINGS

FIG. 1 is an exploded view of a bicycle carrier made in accordance with this invention and a mounting suitable for mounting the carrier on a square bumper such as the rear bumper of a recreational vehicle;

FIG. 2 is an exploded view of the carrier of this invention showing a bracket suitable for mounting on the front bumper of a vehicle in a jurisdiction wherein a front license plate is not required and a stabilizing strap for extension between the carrier and the rear of a vehicle hood;

FIG. 3 is an exploded view of a carrier including a bracket for mounting the carrier on a receiver type trailer hitch;

FIG. 4 is an exploded view of the carrier of this invention showing a bracket for mounting the carrier on a tongue type trailer hitch;

DESCRIPTION OF THE PREFERRED EMBODIMENT

Figure 6:
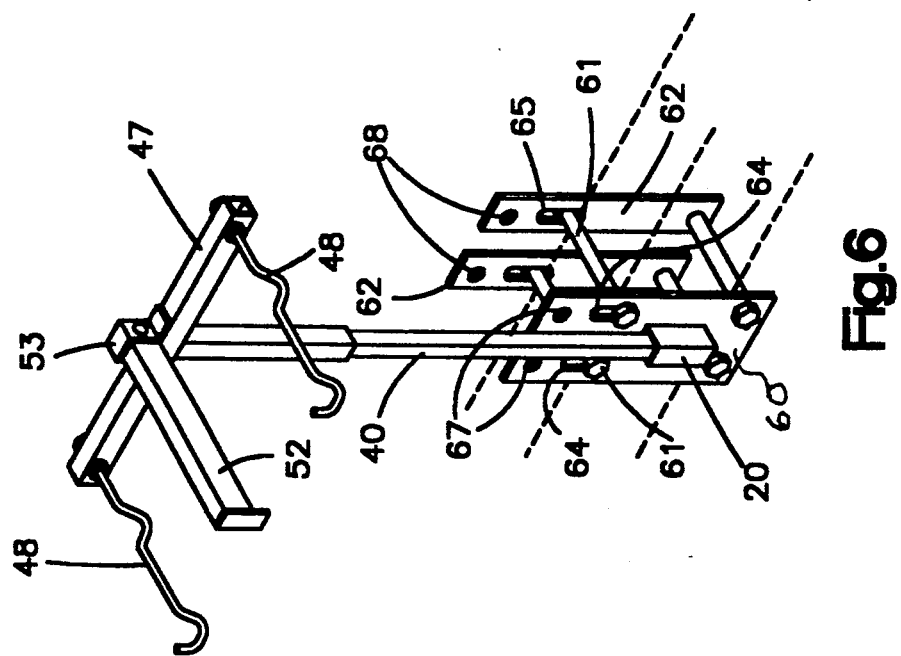

A modular bicycle carrier is shown generally at 10 in each of the figures. The modular carrier 10 is adapted for support by a carrier support appropriate for the installations depicted in the drawings.

In the embodiment of FIG. 1 the modular carrier 10 is supported on a square bumper 12. The carrier support of FIG. 1 includes a mounting plate 14 having four apertures 15. The apertures 15 are positioned and located to receive threaded arms of a pair of U-bolts 16. Nuts 18 thread onto each of the arms of the U-bolts 16 to clamp the bolts and the mounting plate 14 in position on the square bumper 12. A square carrier receiving post 20 in the form of a socket is secured to the mounting plate 14 for support of the modular carrier 10.

In FIG. 6 an alternate form of mounting for a standard square bumper is shown. Here an apertured plate 60 carries the socket 20. The plate 60 is secured to the bumper 12 by bolts 61 and mounting straps 62. In FIG. 6 an upper two of the bolts 61 project through apertures 64, 65 in the plate 60 and the straps 62 to secure the plate to the bumper 12. When the carrier is mounted on a standard 7 inch channel bumper, the upper 2 bolts extend through upper apertures 67, 68 in the plate and straps 60, 62.

In the embodiment of FIG. 2 the mounting plate 14 of FIG. 1 is duplicated. Here the apertures 15 receive bolts 21 to fix the mounting plate 14 to a license plate mounting location and support 22 of a vehicle front bumper. Mounting in this particular manner is obviously intended for use in jurisdictions wherein a vehicle requires only a rear license plate.

The embodiment of FIG. 3 has a carrier support for use with a receiver type trailer hitch. In this embodiment a mounting post 23 also in the form of a socket is fixed to a square bracket tube 24. The bracket tube 24 telescopes into a spacer tube 25 sized for telescoping into a receiver hitch tube 27. If desired the mounting post 23 may be fixed directly to a bracket tube of transverse dimension corresponding to the spacer tube 25 so that the need for both bracket and spacer tubes is eliminated. However, since receiver tubes vary in size, provision of the spacer produces a single product which accommodates direct mounting on a large size receiver as shown or, through elimination of the spacer tube, direct mounting into a smaller size receiver tube corresponding to receiver tube 27. Some customers will prefer the spacer because since one product fits either of two sizes of receivers inventory is reduced. The carrier support of FIG. 3 is held in place by inserting a retaining pin 26 through apertures 28, 29, 30 of the bracket, spacer and receiver tubes 24, 25, 27 respectively.

Referring to FIG. 4 a mounting post 32 is provided that is equipped with a mounting post connector 33. The mounting post connector 33 has a threaded aperture which receives a bolt 44. The bolt 44 projects through an aperture 36 in a tongue 37 to fix the mounting post 32 to the tongue.

Each of the mounting brackets is adapted to receive the same modular carrier 10. The modular carrier 10 includes a support post 40 which telescopes into the socket 20 in the embodiments of FIGS. 1 and 2 or into the mounting posts 23, 32 in the embodiments of FIGS. 3 and 4. Alternately the support post may telescope over a post in the form of a squared mounting pin rather than into a socket type post in the embodiments of FIGS. 3 and 4.

The support post has, in the illustrated embodiment of FIG. 1, a pair of connection limiting apertures 42. A tethered connection limiting pin 43 is provided. The pin 43 is selectively insertable in either of the apertures 42.

A carrier post 45 is provided. The carrier post telescopes over the top of the support post 40. The extent of the telescopic relationship between the support and carrier posts 40, 45 is controlled by inserting the connection limiting pin 43 in one of the apertures 42 or removing the tethered pin and allowing the support and carrier posts to telescope fully together as depicted in the embodiment of FIG. 2.

A carrier arm 47 is secured to the top of the carrier post and projects laterally in both directions in a T-shaped configuration. A pair of bicycle hangers 48 are supported near opposite ends of the arm 47 and secured in place by bolts 49. A bicycle retention arm 52 is removably connectable to a bicycle retention bracket 53. A tethered pin 54 serves to secure the bicycle retention arm and bracket together. When so secured the retention arm 52 serves to retain transported bicycles on the carrier.

In the embodiments of FIGS. 1–3 a flexible anchor strap 56 is provided. The anchor strap has a hook 57 at its remote end for securement to the back of a hood in the case of the embodiment of FIG. 2 or to the front of an auto trunk in case of the embodiments of FIGS. 3 and 4. The strap has an eye 58 which receives the tethered pin 54 to connect the strap to the carrier.

Figure 5:
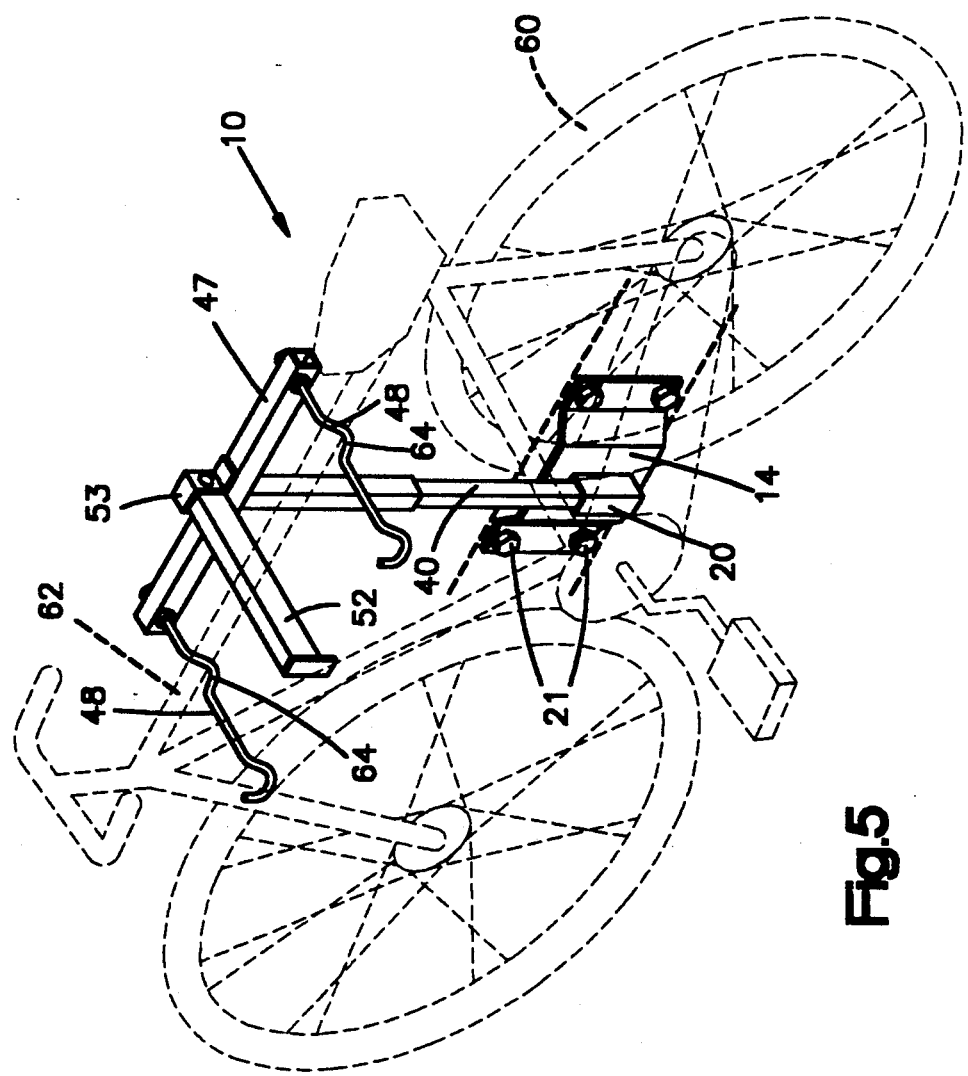
FIG. 5 is a perspective view of the embodiment of FIG. 4 showing in phantom lines a bicycle mounted on the carrier; and, FIG. 6 depicts a mounting bracket suitable for mounting either on a square or a channel bumper.

FIG. 5 depicts a bicycle 60 in phantom lines. The bicycle includes a cross bar 62 which rests in recesses 64 of the hangers 48. An inspection of FIG. 5 will show that the retention arm 52 coacts with the cross bar to retain it in the recesses 64 and thereby secure the bicycle to the carrier.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. Modular components for construction of a carrier assembly for mounting on a vehicle comprising:
   a) a plurality of mounting brackets each connectable to a selected one of a tubular type trailer hitch, a tongue type trailer hitch and a vehicle bumper;
   b) the brackets each including a base post; which is upstanding when in use;
   c) a support post telescopically connectable to the base post, the support and base posts including complemental rotation inhibiting surfaces;
   d) a carrier post telescopically connectable with the support post, the support and carrier posts including complemental rotation inhibiting surfaces; and
   e) a carrier means adapted to be secured to the carrier post, the carrier means being adapted to support an item to be transported.

2. The carrier assembly components of claim 1 wherein a height control device is provided, the device being coactable with a selected two of the posts to limit the extent of the telescopic connection of the selected posts.

3. The assembly components of claim 2 wherein the selected posts are the support and carrier posts.

4. The assembly components of claim 1 wherein the posts are polygonal.

5. The assembly components of claim 1 wherein one bracket includes a polygonal tube telescopically engageable with a trailer hitch assembly tube and the base post projects laterally from the polygonal tube.

6. The assembly components of claim 1 wherein one bracket includes interconnectable threaded elements, a first of the elements being fixed to the base post, one of the elements being projectable through an aperture of a tongue hitch and the elements when interconnected being adapted to secure the base post to such tongue.

7. The assembly components of claim 1 wherein one bracket includes a member adapted to be connected to a vehicle bumper and wherein the base post is fixed to the member.

* * * * *